US009126648B2

(12) United States Patent
Nishimura et al.

(10) Patent No.: US 9,126,648 B2
(45) Date of Patent: Sep. 8, 2015

(54) FUEL TANK ASSEMBLY FOR MOTORCYCLE, AND MOTORCYCLE INCORPORATING SAME

(75) Inventors: Shin Nishimura, Saitama (JP); Keita Kinoshita, Saitama (JP); Takaaki Shomura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 345 days.

(21) Appl. No.: 13/191,633

(22) Filed: Jul. 27, 2011

(65) Prior Publication Data

US 2012/0025510 A1 Feb. 2, 2012

(30) Foreign Application Priority Data

Jul. 30, 2010 (JP) ................................ 2010-171367

(51) Int. Cl.
*B62J 35/00* (2006.01)
*B62J 37/00* (2006.01)
*F02M 37/10* (2006.01)

(52) U.S. Cl.
CPC *B62J 35/00* (2013.01); *B62J 37/00* (2013.01); *F02M 37/10* (2013.01)

(58) Field of Classification Search
CPC ........... B62J 35/00; B62J 37/00; F02M 37/10
USPC .................... 280/834, 835; 180/219; 123/509
See application file for complete search history.

(56) References Cited

U.S. PATENT DOCUMENTS 4,396,084 A * 8/1983 Yoshimura et al. ........... 180/219
4,653,762 A * 3/1987 Nakamura et al. ............ 280/835
4,706,774 A * 11/1987 Tsuboi .......................... 180/227
4,742,884 A * 5/1988 Ishikawa ........................ 180/219
4,765,431 A * 8/1988 Yoshioka ....................... 180/219
5,145,023 A 9/1992 Tsurumi et al.
6,182,640 B1 * 2/2001 Nakashima et al. .......... 123/516
6,189,638 B1 * 2/2001 Ito et al. ........................ 180/227
6,253,790 B1 * 7/2001 Hara ........................ 137/565.17
6,290,017 B1 * 9/2001 Ito ................................ 180/227
6,401,750 B2 * 6/2002 Tokunaga ................ 137/565.34
6,691,814 B2 * 2/2004 Toyoda ......................... 180/227
6,805,214 B2 * 10/2004 Maeda et al. ................ 180/69.4
7,159,885 B2 * 1/2007 Toyoda et al. ................ 280/284

(Continued)

FOREIGN PATENT DOCUMENTS

EP 417727 A1 * 3/1991 ............ B62K 25/28
GB 1 448 663 A 9/1976

(Continued)

*Primary Examiner* — Joseph Rocca
*Assistant Examiner* — Michael Stabley
(74) *Attorney, Agent, or Firm* — Carrier Blackman & Associates, P.C.; Joseph P. Carrier; Fulchand P. Shende

(57) ABSTRACT

A fuel tank assembly includes a fuel tank disposed substantially along a seat rail in a space surrounded by a lower portion of a seat and the seat rail of a motorcycle, and a fuel pump unit disposed in a lower portion of the fuel tank. A mounting flange for mounting the fuel pump unit to the fuel tank is arranged below the seat rail and forward of a front end of a rear wheel of the motorcycle as viewed in a side view of the motorcycle. The mounting flange of the fuel pump unit is disposed above a side frame of a body frame of the motorcycle. Such fuel tank assembly provides the degree of freedom of seat layout, and does not interfere with a rear wheel of motorcycle, or gravel or the like thrown up by the rear wheel, during operation the motorcycle.

20 Claims, 10 Drawing Sheets

30
35
31
37 39 38
31a 31b 31c
33
34
32
32
41
42
43
43j
49

(56) References Cited

U.S. PATENT DOCUMENTS

| | | | | |
|---|---|---|---|---|
| 7,401,597 | B2 * | 7/2008 | Koike et al. | 123/509 |
| 7,422,243 | B2 * | 9/2008 | Kudo et al. | 280/834 |
| 7,438,149 | B2 * | 10/2008 | Ishida et al. | 180/227 |
| 7,451,745 | B2 * | 11/2008 | Okazaki et al. | 123/509 |
| 7,484,766 | B2 | 2/2009 | Iwasaki | |
| 7,533,904 | B2 * | 5/2009 | Koike et al. | 280/834 |
| 7,547,030 | B2 * | 6/2009 | Toyoda et al. | 280/286 |
| 7,614,468 | B2 * | 11/2009 | Satake et al. | 180/68.3 |
| 7,644,795 | B2 * | 1/2010 | Kawamura et al. | 180/219 |
| 7,681,682 | B2 * | 3/2010 | Miyashiro | 180/219 |
| 7,681,920 | B2 * | 3/2010 | Iwasaki | 280/831 |
| 7,992,901 | B2 * | 8/2011 | Hirano et al. | 280/833 |
| 8,196,989 | B2 * | 6/2012 | Yokoyama et al. | 296/66 |
| 2005/0279330 | A1 * | 12/2005 | Okazaki et al. | 123/509 |
| 2006/0283650 | A1 * | 12/2006 | Kawamura et al. | 180/227 |
| 2013/0105234 | A1 * | 5/2013 | Nishimura et al. | 180/69.4 |

FOREIGN PATENT DOCUMENTS

| | | | | | |
|---|---|---|---|---|---|
| JP | 62029481 | A | * | 2/1987 | |
| JP | 01156118 | A | * | 6/1989 | B60G 7/00 |
| JP | 03224885 | A | * | 10/1991 | B62J 35/00 |
| JP | 04039186 | A | * | 2/1992 | B62J 31/00 |
| JP | 04039187 | A | * | 2/1992 | B62J 35/00 |
| JP | 04189691 | A | * | 7/1992 | B62J 35/00 |
| JP | 2007-118627 | A | | 5/2007 | |
| JP | 3159209 | U | | 5/2010 | |

* cited by examiner 1
3
25
11
10
24
23
59
6
26
16
58
17
15
43
49
53
27
14
18
57
13
55
28
7
8
31
35
30
5
29
4
2
20
19
12
22
21

32
32
34
33
30
31
35
32
32

FUEL TANK ASSEMBLY FOR MOTORCYCLE, AND MOTORCYCLE INCORPORATING SAME

CROSS-REFERENCE TO RELATED APPLICATIONS

The present invention claims priority under 35 USC §119 based on Japanese patent application No. 2010-171367, filed on Jul. 30, 2010. The entire subject matter of this priority document, including specification claims and drawings thereof, is incorporated by reference herein.

BACKGROUND OF THE INVENTION

1. Field of the Invention

The present invention relates to a fuel tank assembly for a motorcycle, and to a motorcycle incorporating the same. More particularly, the present invention relates to a fuel tank assembly having a fuel tank disposed substantially along a seat rail, to a fuel pump unit disposed in the fuel tank via a mounting flange arranged below the seat rail, and to a motorcycle incorporating the same.

2. Description of the Background Art

There is a known structure in which a fuel tank is located below a seat of a vehicle (motorcycle) and a fuel pump is mounted in the fuel tank. An example of such structure is disclosed in Japanese Published Patent document 2007-118627.

The structure disclosed in the Japanese Patent Published Patent document 2007-118627 is an upper-mount type fuel pump, in which the fuel pump is installed in the upper portion of the fuel tank. Therefore, it is necessary to provide a space between the seat and the fuel tank for installing a fuel pipe therein, for supplying fuel to an engine of the vehicle. In view of a change of shape of the seat when an occupant sits thereon, it is necessary to ensure that a space is not smaller than a vertical width needed to arrange fuel piping. In addition, there is also a restriction on seat layout.

In order to ensure the degree of freedom of the seat layout, a structure is considered in which the space between the seat and the fuel tank is made minimal. Such structure corresponds to a lower-mount type fuel pump, where a fuel pump is mounted in the lower portion of the fuel tank.

However, if the lower-mount type fuel pump is applied to the above-mentioned conventional example as it is, the fuel pump will be disposed right above the rear wheel. Since the rear wheel swings vertically, it is necessary to provide a sufficient interval between the rear wheel and the fuel pump unit including a fuel pump, a mounting flange, and a fuel piping. In addition, it is necessary to avoid interference with gravel thrown up by the rear wheel.

The present invention has been made to overcome the drawbacks of existing fuel tank assemblies and in-tank fuel pumps. In view of the above difficulties with the known designs, in order to ensure the degree of freedom of seat layout, even a vehicle in which a fuel pump is lower-mounted in a fuel tank needs to have a fuel tank assembly in which a fuel pump unit does not interfere with a rear wheel or gravel or the like thrown up by the rear wheel during operation of the vehicle.

Accordingly, it is one of the objects of the present invention to provide a fuel tank assembly in which a fuel pump is mounted in a lower portion of a fuel tank, and a fuel pump unit does not interfere with a rear wheel or gravel or the like thrown up by the rear wheel during operation of the motorcycle, while ensuring a high degree of freedom of seat layout.

SUMMARY OF THE INVENTION

In the following discussion, reference numbers are those used in the drawings. In order to achieve the above objects, a first aspect of the present invention provides a fuel tank assembly (30) for a motorcycle (1) having a body frame having a seat rail (7), a seat (28) supported on the seat rail (7), an engine supported by the body frame (2), and a rear wheel (13).

The fuel tank assembly according to the first aspect includes a fuel tank (31) disposed substantially along a seat rail (7) in a space surrounded by a lower portion of a seat (28) of the motorcycle (1) and the seat rail (7); and a fuel pump unit (35), having a mounting flange (43), disposed in a lower portion of the fuel tank (31). The present invention according to the first aspect is characterized in that a mounting flange (43) for mounting the fuel pump unit (35) to the fuel tank (31) is arranged below the seat rail (7) and forward of a front end of the rear wheel (13) of the motorcycle (1) as viewed in a side view of the vehicle.

The present invention according to a second aspect thereof, in addition to the first aspect, is characterized that the body frame (2) further includes a side frame (8) extending from the rear of an engine (16) of the motorcycle toward the rear and upside of the vehicle (1) below the seat rail (7); and in that the mounting flange (43) of the fuel pump unit (35) is disposed above the side frame (8).

The present invention according to a third aspect thereof, in addition one of the first and second aspects, is characterized in that the mounting flange (43) of the fuel pump unit (35) and a discharge pipe (49) extending from the fuel pump unit (35) are located in a space defined by the seat rail (7) and the side frame (8) as viewed in a side view of the vehicle/motorcycle (1).

The present invention according to a fourth aspect thereof, in addition to one of the first through third aspects, is characterized in that a body frame crossmember (29) connecting the left and right body frame (2) together is installed between a main frame (4) and the seat rail (7) and the mounting flange (43) of the fuel pump unit (35) is located behind and proximate the body frame crossmember (29).

The present invention according to a fifth aspect thereof, in addition to one of the first through fourth aspects, is characterized in that a swing arm crossmember (53) provided on a swing arm (14) supporting the rear wheel (13) is formed to partially overlap the fuel pump unit (35) as viewed vertically.

Effects of the Invention

According to the first aspect of the present invention, the fuel pump unit (35) is housed in the lower portion of the fuel tank (31). In addition, the mounting flange (43) of the fuel pump unit (35) is arranged below the seat rail (7) and forward of the front end of the rear wheel (13) of the motorcycle (1) as viewed in a side view of the vehicle.

Therefore, while achieving the lowered gravity center of the fuel tank (31), the space between the fuel pump unit (35) and the rear wheel (13) can be made larger compared with the case where the fuel pump unit (35) is installed right above the rear wheel (13). Thus, the fuel pump unit (35) can be prevented from interfering with the rear wheel (13) or gravel or the like thrown up by the rear wheel (13) during operation of the motorcycle (1).

According to the second aspect of the present invention, the mounting flange (43) is disposed above the side frame (8). Therefore, a larger space between the fuel pump unit (35) and the rear wheel (13) can be ensured compared with the case where the mounting flange (43) is disposed below the side frame (8). Thus, the fuel pump unit (35) can be prevented from interfering with the rear wheel (13) or gravel or the like thrown up by the rear wheel (13) during operation of the vehicle (1).

According to the third aspect of the present invention, the mounting flange (43) of the fuel pump unit (35) and the discharge pipe (49) are located in the space defined by the seat rail (7) and the side frame (8) as viewed in a side view of the vehicle (1). Therefore, the mounting flange (43) and the discharge pipe (49) can visually be confirmed and easily be maintained by hand work.

According to the fourth aspect of the present invention, the body frame crossmember (29) connecting the left and right body frames (2) together is installed between the main frame (4) and the seat rail (7). In addition, the mounting flange (43) of the fuel pump unit (35) is located behind and proximate the body frame crossmember (29). Therefore, the rigidity of the fuel pump unit (35) can be ensured.

According to the fifth aspect of the present invention, the swing arm crossmember (53) provided on the swing arm (14) supporting the rear wheel (13) is formed to partially overlap the fuel pump unit (35) as viewed vertically. Therefore, the fuel pump unit can be protected from gravel or the like thrown up from below during operation of the vehicle (1).

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIGS. 8A and 8B illustrate the vicinity of a fuel pump unit insertion hole 44 of a fuel tank 31, in which FIG. 8A is a left lateral view of the fuel tank, and FIG. 8B is a view as viewed from arrow B in FIG. 8A.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Figure 1:
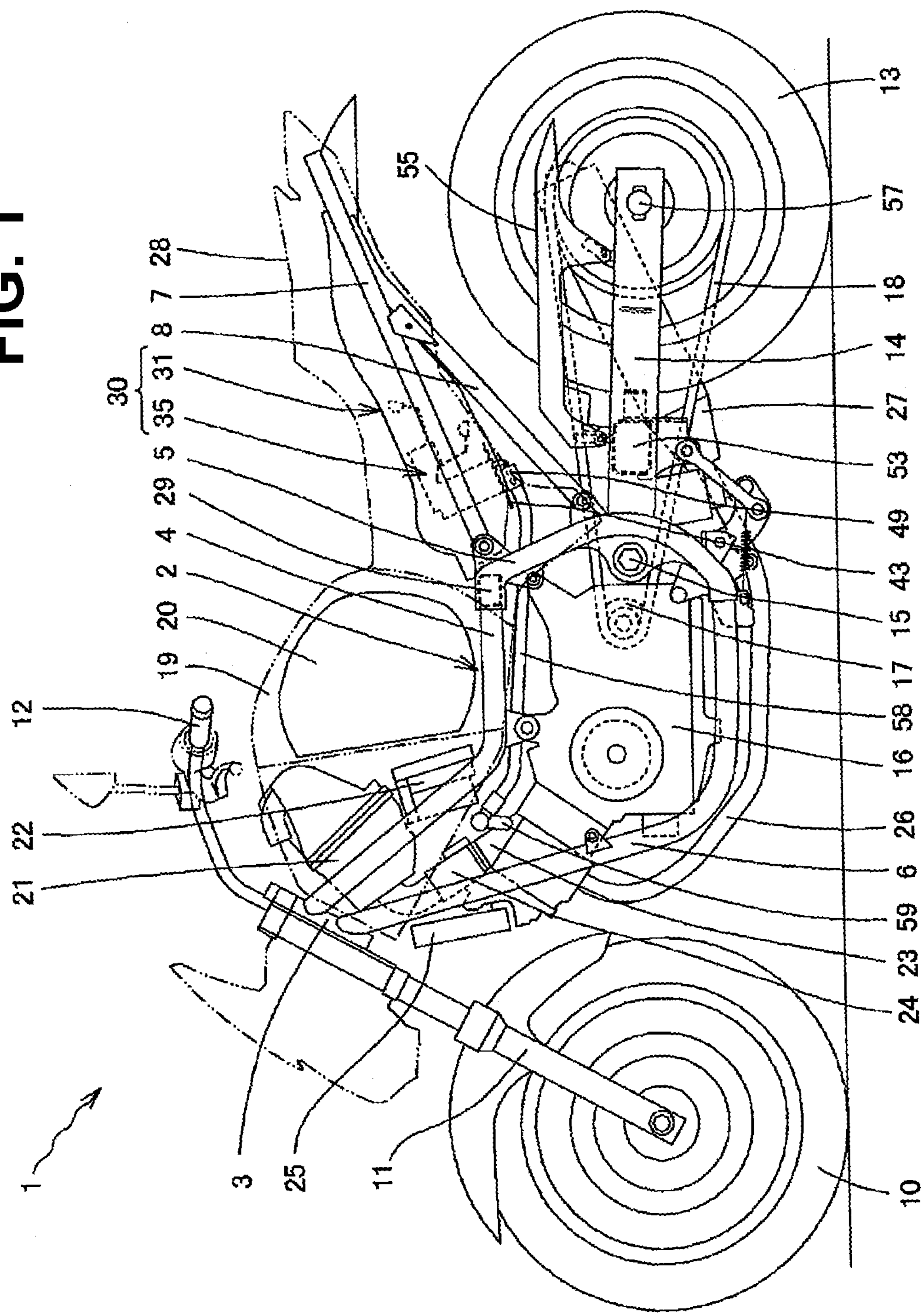
FIG. 1 is a side plan view of a motorcycle according to an illustrative embodiment of the present invention.

FIG. 1 is a side plan view of a motorcycle 1 according to an illustrative embodiment of the present invention. The motorcycle 1 includes a body frame 2 having a head pipe 3, a pair of left and right main frames 4, a pair of left and right center frames 5, a pair of left and right down frames 6, a pair of left and right seat rails 7, and a pair of left and right side frames 8.

The main frames 4 extend obliquely rearward from the head pipe 3, and then extend horizontally rearward. The center frames 5 are joined to corresponding rear ends of the main frames 4 and extend downward. The down frames 6 extend downward from the head pipe 3, then toward the horizontal rearward and are joined to corresponding lower ends of the center frames 5. The seat rails 7 are joined to corresponding upper portions of the center frames 5 and extend rearward upward. The side frames 8 are joined to corresponding central portions (located rearward of an engine 16) of the center frames 5 and spanned between the central portions of the center frames 5 and a pair of corresponding left and right side frames 8.

A front fork 11, supporting a front wheel 10, is steerably supported by the head pipe 3. A steering handlebar 12 is connected to the upper portion of the front fork 11. A swing arm 14, rotatably supporting a rear wheel 13, is vertically swingably supported by the center frames 5 via a pivot bolt 15.

An engine 16 is supported by the main frames 4, the center frames 5 and the down frames 6. The power of the engine 16 is transmitted to the rear wheel 13 via a rear wheel driving sprocket 17 and a rear wheel driving chain 18. A helmet box 19 is formed above the engine 16 and a helmet 20 is housed in the helmet box 19. An air cleaner 21 and a battery 22 are disposed between the head pipe 3 and the helmet box 19.

A throttle body 24, formed continuous with an intake port 23 of the engine 16, is connected to the air cleaner 21. A radiator 25 is disposed in front of the engine 16 and cools cooling water. An exhaust pipe 26 extending from the front surface of the engine 16 passes below the engine 16 and communicates with a muffler 27 located at the rear portion of the vehicle body.

A fuel tank 31 is mounted on the upper portions of the center frames 5 and the seat rails 7. A tandem seat 28 for a rider and a pillion passenger is mounted to cover the upper portion of the fuel tank 31. A body frame crossmember 29 is installed between the main frames 4 and the seat rails 7, for connecting the left and right body frames 2 together. It will be understood from FIG. 1 that the fuel tank 31 is arranged in a back and forth direction of the motorcycle 1 such that a front end portion of the fuel tank 31 is located at a position beyond a front end portion of the seat rail 7.

Figure 2:
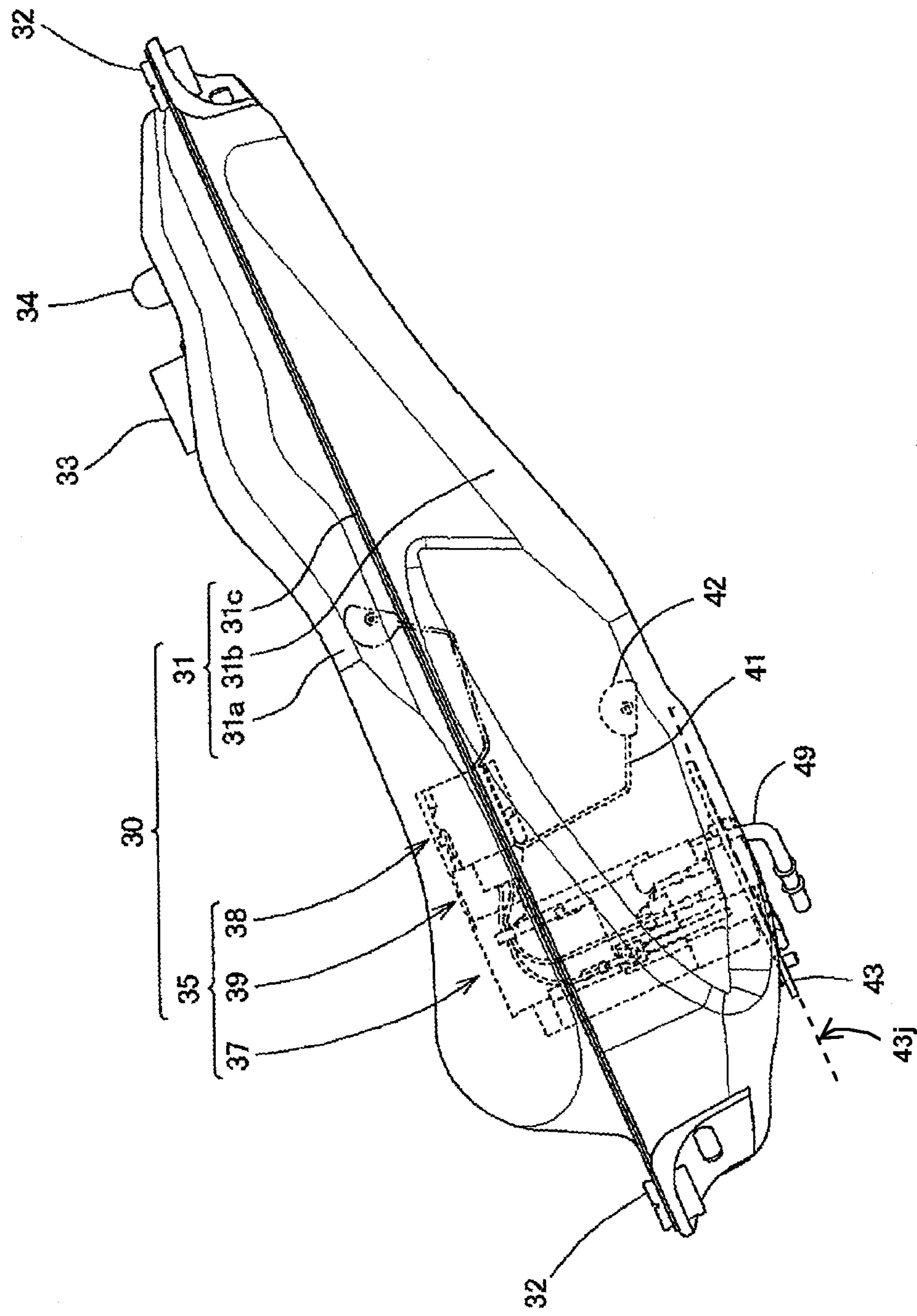
FIG. 2 is a left lateral view of a fuel tank assembly according to the present invention.
Figure 3:
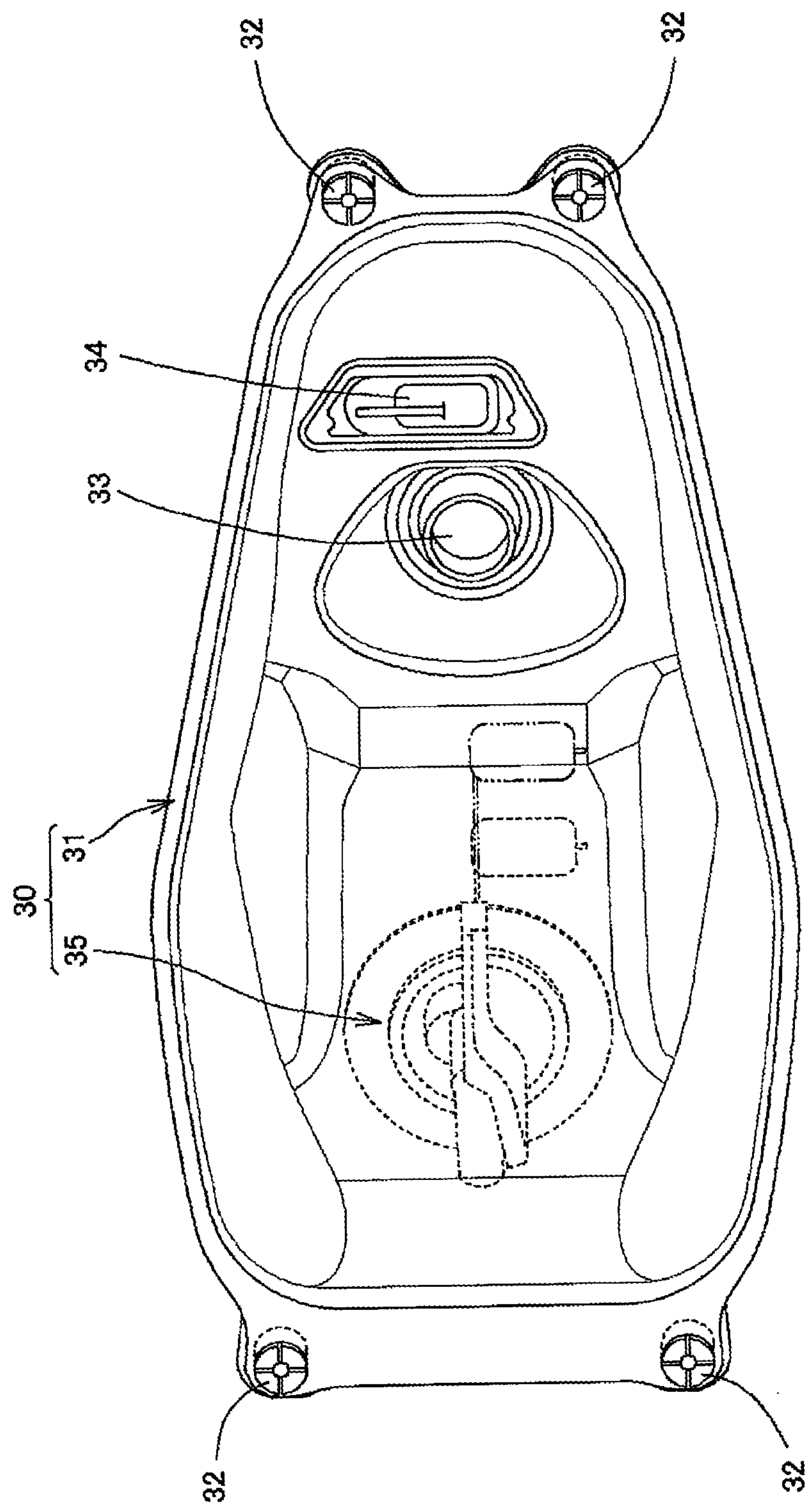
FIG. 3 is a top plan view of the fuel tank assembly.
Figure 4:
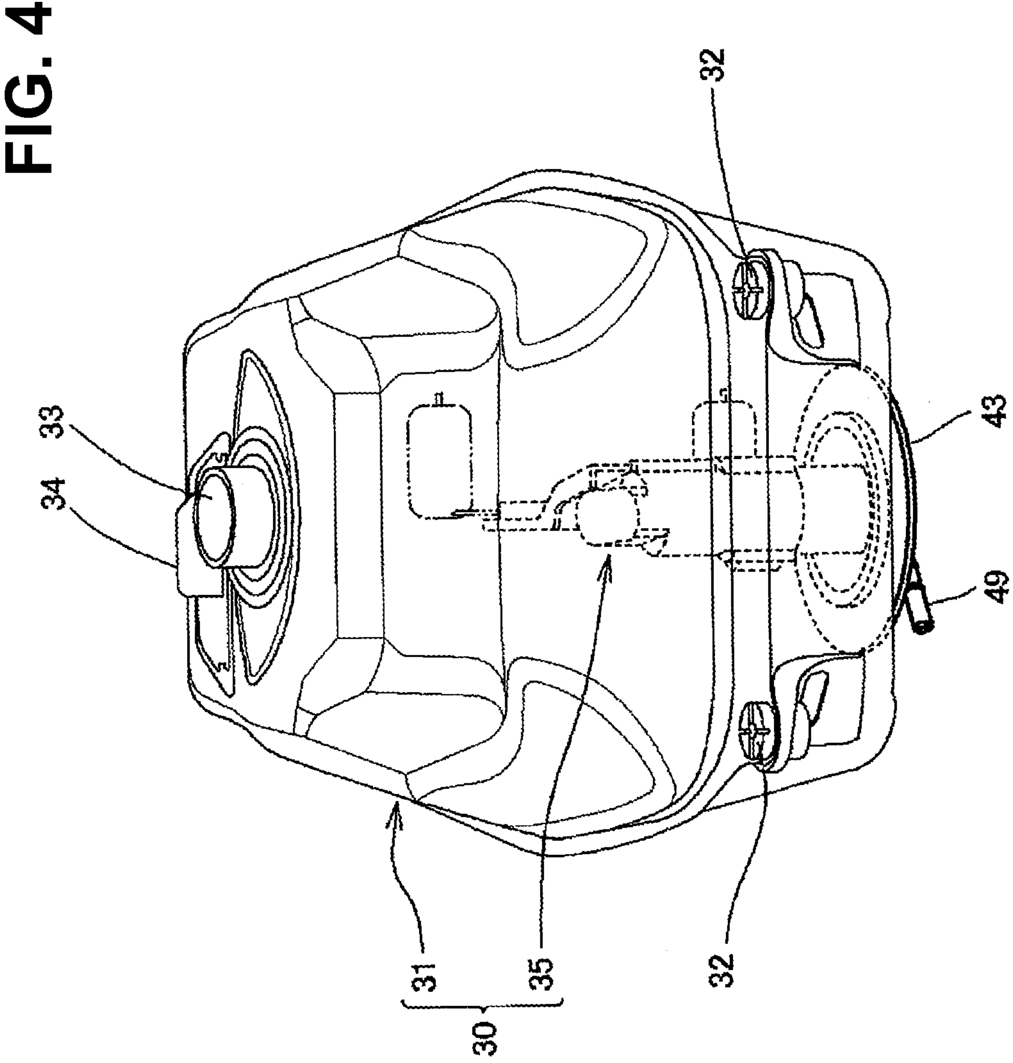
FIG. 4 is a front perspective view of the fuel tank assembly.

FIG. 2 is a left lateral view of a fuel tank assembly 30 mounted on the motorcycle 1. FIG. 3 is a top plan view of the fuel tank assembly 30. FIG. 4 is a front perspective view of the fuel tank assembly 30.

The fuel tank assembly 30 includes the fuel tank 31, and a fuel pump unit 35 installed inside of the fuel tank. The fuel tank 31 is formed in a long and flat shape, and is mounted on the motorcycle 1 so as to be tilted in the back and forth direction. The fuel pump unit 35 is mounted inside of, and on a bottom plate side of the fuel tank 31.

The fuel tank 31 includes a tank upper half body 31*a* and a tank lower half body 31*b*. The tank upper and lower half bodies 31*a*, 31*b* have respective flange portions on the circumferences thereof. The flange portions are opposed to each other to constitute an upper-lower mating surface 31*c*. The flange portions of the tank upper and lower half bodies 31*a*, 31*b* are seam-welded at the mating surface 31*c*. Thus, the fuel tank 31 is formed as an integral tank provided with a cavity therein.

The fuel tank 31 is provided with fuel tank mounting portions 32 at front, rear, left and right positions, i.e., at four positions in total. The fuel tank 31 is disposed substantially along the seat rails 7, in a space defined between the lower surface of the seat 28 and the seat rails 7. In addition, the fuel tank 31 is mounted to the center frames 5 and the seat rails 7 via the fuel tank mounting portions 32. A filler neck 33 and a breather 34 are provided in the upper rear surface of the fuel tank 31.

Figure 5:
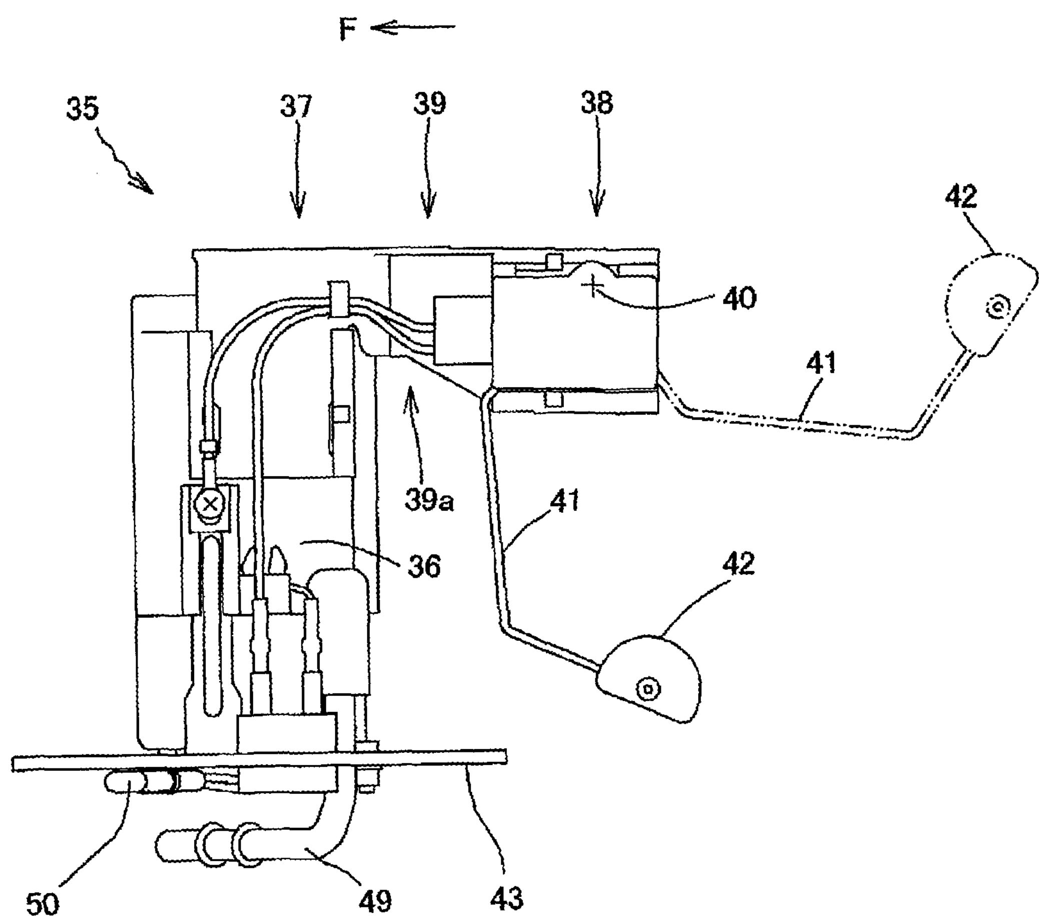
FIG. 5 is a left lateral view of a fuel pump unit of the fuel tank assembly.
Figure 6:
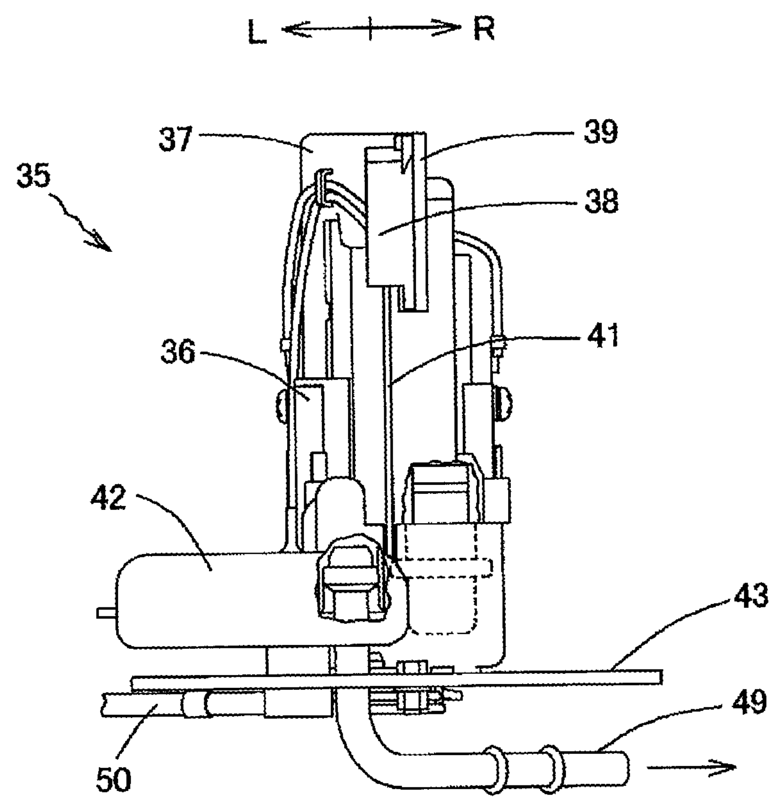
FIG. 6 is a rear view of the fuel pump unit fuel tank assembly.
Figure 7:
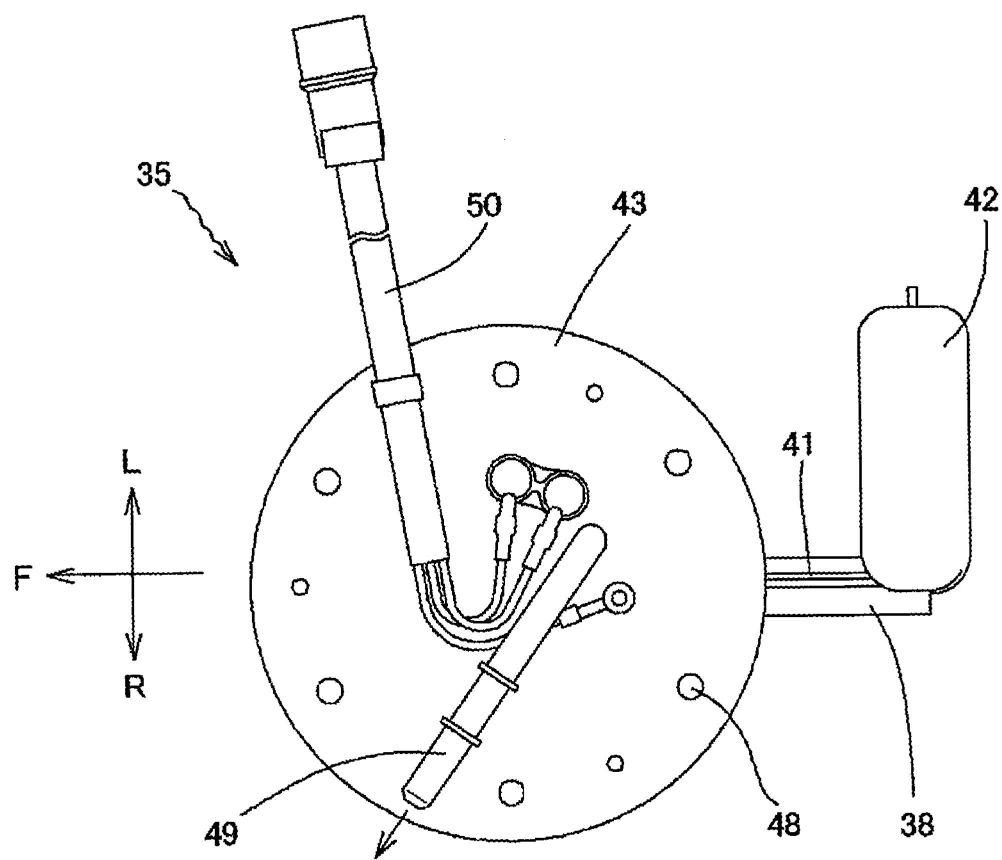
FIG. 7 is a bottom view of the fuel pump unit fuel tank assembly.

FIG. 5 is a left lateral view of the fuel pump unit 35. FIG. 6 is a rear view of the fuel pump unit 35. FIG. 7 is a bottom view of the fuel pump unit 35.

The fuel pump unit 35 includes a main body portion 37 in which a fuel pump 36 is housed; a fuel level gauge 38; and a support portion 39 extending from the main body portion 37 to support the fuel level gauge 38. The fuel level gauge 38 is provided with a float 42 attached to a turning shaft 40 via an elongate float arm 41. FIG. 5 shows the lowest position (a solid line) and highest position (a two-dot chain line) of the float 42. The float 42 moves according to the fuel level to turn the turning shaft 40. The turning of the turning shaft 40 is electrically read and converted as a fuel level, which is displayed for the occupant.

A mounting flange 43 is provided on a lower portion of the main body portion 37 of the fuel pump unit 35. The fuel pump unit 35 is mounted to the fuel tank 31 as below.

The float 42, the float arm 41, the fuel level gauge 38, the support portion 39 and the main body portion 37 are inserted in such order up to the upper surface of the mounting flange 43 through a fuel pump unit insertion hole 44 (FIG. 8). The mounting flange 43 is secured to the lower portion of the fuel tank 31 by using bolts and nuts forming a joining plane 43*j* between the fuel tank 31 and the mounting flange 31. In this way, the fuel pump unit 35 is secured to the fuel tank 31. The support portion 39 is formed with a cutout recess portion 39*a* on the lower edge thereof so that the fuel pump unit 35 can inserted through the fuel pump unit insertion hole 44 in the bottom surface of the fuel tank 31 when the fuel pump unit 35 is mounted.

Figure 8A:
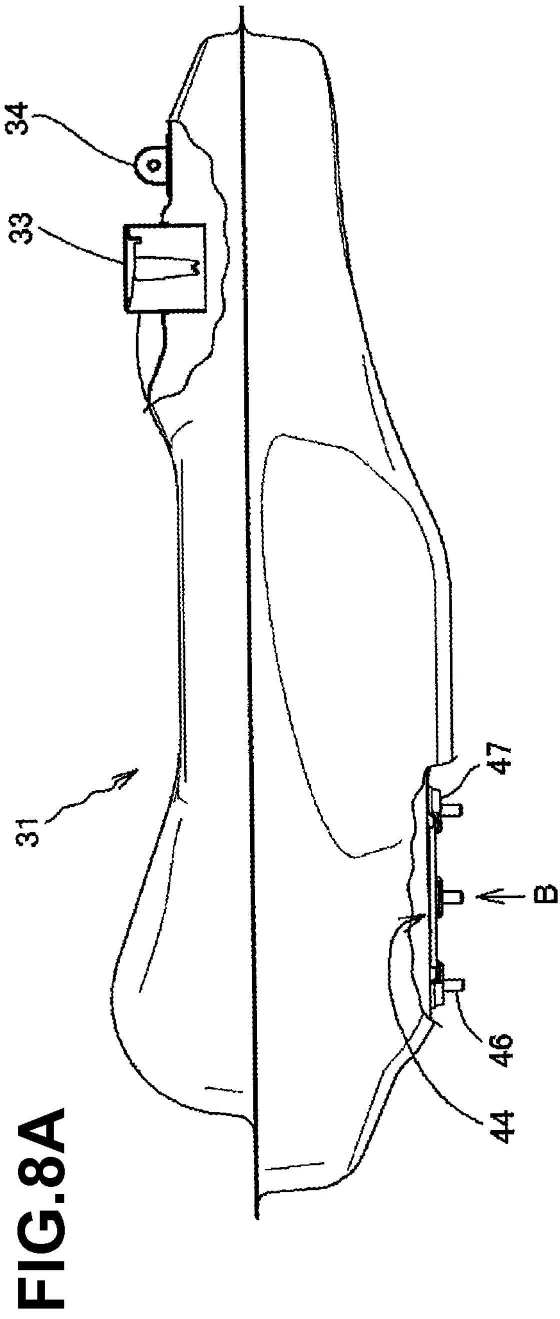
Figure 8B:
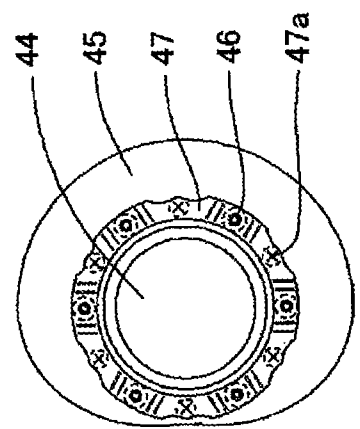

FIG. 8A is a left lateral view of the fuel tank 31. FIG. 8B is a front view as viewed from arrow B of FIG. 8A, illustrating the vicinity of the fuel pump unit insertion hole 44 in the bottom surface of the fuel tank 31.

The fuel tank 31 is provided with the fuel pump unit insertion hole 44 in the bottom surface thereof. The circumference of the fuel pump unit insertion hole 44 is formed as a flat surface portion 45. A ring-like member 47 holding a plurality of bolts 46 is welded to the circumferential portion of the fuel pump unit insertion hole 44 by spot welding 47*a* or by laser beam welding. The mounting flange 43 (FIG. 7) is provided with a plurality of bolt insertion holes 48 corresponding to the plurality of bolts 46. The fuel pump unit 35 is secured to the bottom of the fuel tank 31 by inserting the bolts 46 through the corresponding bolt insertion holes 48 and tightening them with nuts.

A discharge pipe 49, used to discharge fuel from the fuel pump 36, is installed on the lower side of the mounting flange 43 located in the lower portion of the fuel pump unit 35 (see FIGS. 5 to 7). Further, a bundle 50 of electrical wires such as an electrical line used to drive the fuel pump 43, a signal electrical line connected to a fuel level gauge, and other electrical lines is provided on the lower side of the mounting flange 43. The discharge pipe 49 is illustrated also in FIG. 1. As shown in FIG. 1, a fuel supply hose 58 is connected to the discharge pipe 49. The fuel pump 36 is driven to supply the fuel in the fuel tank 31 to a fuel injection valve 59 communicating with the intake port 23.

As shown in FIG. 1, the mounting flange 43 for mounting the fuel pump unit 35 to the fuel tank 31 is disposed below the seat rails 7 and forward of the front end of the rear wheel 13 of the motorcycle as viewed in a side view of the vehicle.

Therefore, while achieving the lowered gravity center of the fuel tank 31, a space between the fuel pump unit 35 and the rear wheel 13 can be made large compared with the case where the fuel pump unit 35 is installed right above the rear wheel 13. Thus, it is possible to prevent interference between the fuel pump unit 35 and the rear wheel 13 or gravel or the like thrown up by the rear wheel 13.

Further, as shown in FIG. 1, the mounting flange 43 of the fuel pump unit 35 is disposed above the side frames 8. Therefore, the larger space between the fuel pump unit 35 and the rear wheel 13 can be ensured compared with the case where the mounting flange 43 is installed below the side frames 8. Thus, it is possible to prevent interference between the fuel pump unit 35 and the rear wheel 13 or gravel or the like thrown up by the rear wheel 13.

Also as shown in FIG. 1, the mounting flange 43 of the fuel pump unit 35 and the discharge pipe 49 are located in the space defined by the seat rails 7 and the side frames 8. Therefore, the mounting flange 43 and the discharge pipe 49 can visually be confirmed from the side and thus easily be maintained by hand work.

Further as shown in FIG. 1, the body frame crossmember 29 connecting the left and right body frame 2 together is installed between the main frames 4 and the seat rails 7. In addition, the mounting flange 43 of the fuel pump unit 35 is located behind and proximate the body frame crossmember 29. Therefore, the rigidity of the fuel pump unit 35 can be ensured.

Figure 9:
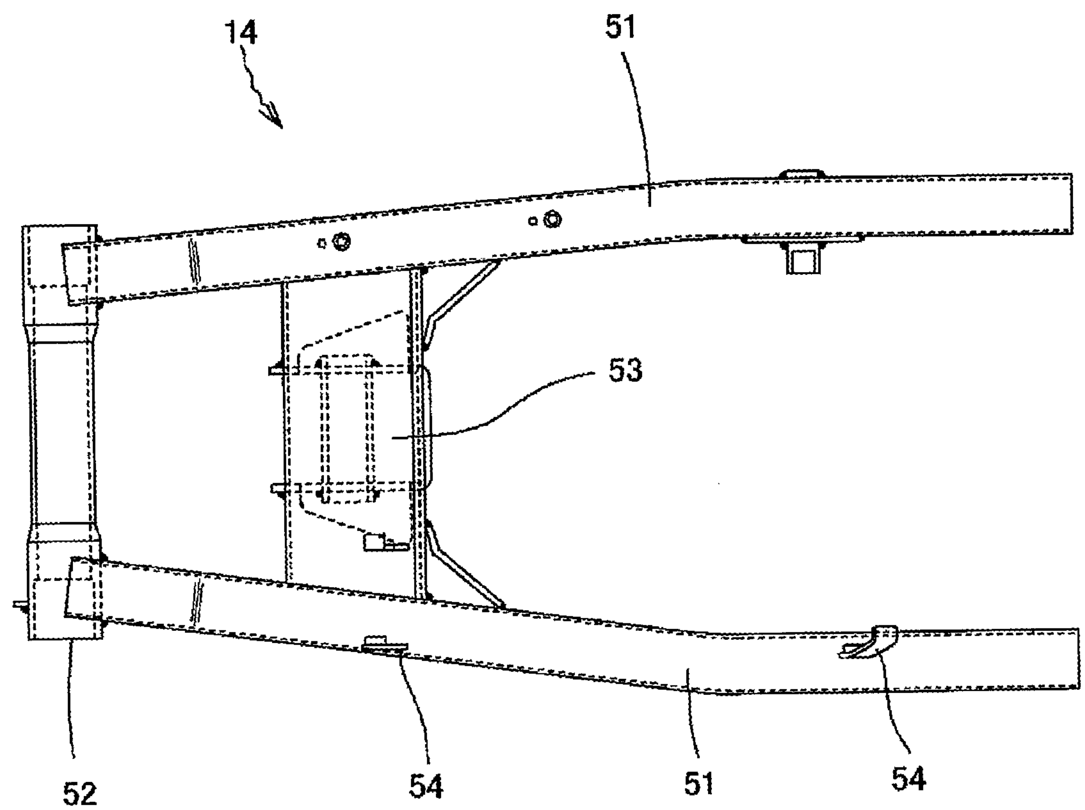
FIG. 9 is a top plan view of a swing arm supporting a rear wheel of the motorcycle.
Figure 10:
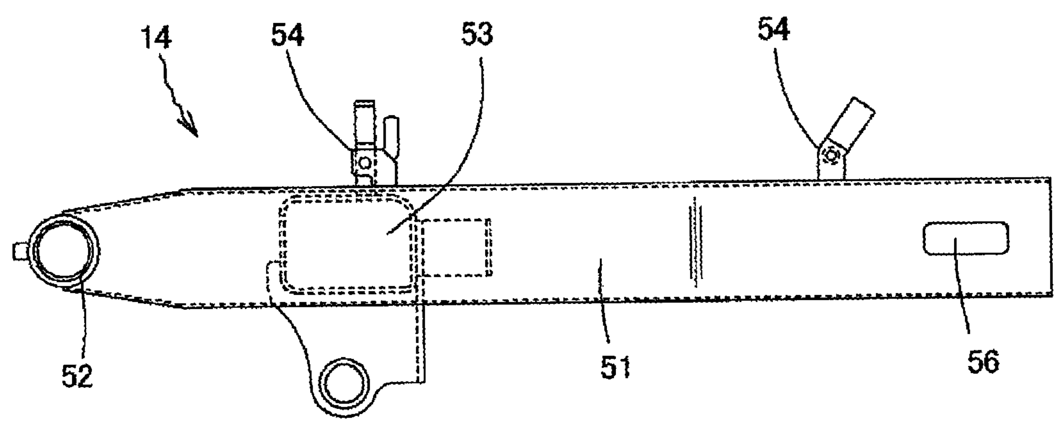
FIG. 10 is a left lateral view of the swing arm.

FIG. 9 is a top plan view of the swing arm 14. FIG. 10 is a left lateral view of the swing arm 14.

The swing arm 14 includes left and right fork portions 51 connected at their respective front ends by a pivot bolt insertion pipe 52, and also by a swing arm crossmember 53 located slightly rearward of the pivot bolt insertion pipe 52. Chain cover attachment portions 54 are provided on the upper surface of the left fork portion 51. A chain cover 55 (FIG. 1) is attached to the chain cover attachment portions 54. The fork portions 51 are each formed at a rear portion with a rear axle support hole 56 adapted to support a rear axle 57 (FIG. 1).

The swing arm crossmember 53 is formed to partially overlap the fuel pump unit 35 as viewed from below. Therefore, the fuel pump unit 35 can be protected from gravel or the like thrown up from below.

The described embodiment of the inventive fuel tank assembly can produce the following effects.

(1) The mounting flange 43 used to mount the fuel pump unit 35 to the fuel tank 31 is disposed below the seat rails 7 and forward of the front end of the rear wheel 13 of the motorcycle 1, as viewed in a side view of the vehicle. Therefore, while achieving the lowered gravity center of the fuel tank 31, the space between the fuel pump unit 35 and the rear wheel 13 can be made large. Thus, it is possible to prevent interference between the fuel pump unit 35 and the rear wheel 13 or gravel or the like thrown up by the rear wheel 13.

(2) The mounting flange 43 of the fuel pump unit 35 is disposed above the side frames 8. Therefore, the larger space between the fuel pump unit 35 and the rear wheel 13 can be ensured. Thus, it is possible to prevent interference between the fuel pump unit 35 and the rear wheel 13 or gravel or the like thrown up by the rear wheel 13.

(3) The mounting flange 43 of the fuel pump unit 35 and the discharge pipe 49 are located in the space defined by the seat rail 7 and the side frame 8. Therefore, the mounting flange 43 and the discharge pipe 49 can visually be confirmed from the side and thus easily be maintained by hand work.

(4) The mounting flange 43 of the fuel pump unit 35 is located behind and proximate the body frame crossmember 29 installed between the main frames 4 and the seat rails 7. Therefore, the rigidity of the fuel pump unit 35 can be ensured.

(5) The fuel pump unit 35 can be protected from gravel or the like thrown up from below by the swing arm crossmember 53 provided on the swing arm 14 supporting the rear wheel.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A fuel tank assembly for a motorcycle having a body frame including a seat rail, a seat supported on the seat rail, an engine supported by the body frame, and a rear wheel operatively attached to the body frame, said fuel tank assembly comprising:

a fuel tank disposed extending substantially along the seat rail in a space proximate to a lower portion of the seat and the seat rail, and located substantially over the rear wheel of the motorcycle; and a fuel pump unit disposed in a forward lower portion of the fuel tank and at an angle from a horizontal plane, said fuel pump unit comprising a fuel pump and a mounting flange for mounting the fuel pump to the fuel tank;

wherein said fuel tank is formed in a long and flat shape, and is arranged in a tilted manner in a back and forth direction of the motorcycle so as to extend substantially along the seat rail such that a front end portion of the fuel tank is located at a position beyond a front end portion of the seat rail;

wherein the fuel tank is supported at a front end portion thereof by a front end portion of said seat rail;

wherein said mounting flange is arranged below the seat rail and forward of a front end of the rear wheel of the motorcycle, as viewed in a side view of the motorcycle, said mounting flange being a plate shaped cylindrical member having a plurality of insertion holes formed therein; and wherein said mounting flange is secured to a lower portion of the fuel tank such that substantially the entire body of the fuel pump unit is mounted inside said fuel tank and above a joining plane between the fuel tank and the mounting flange.

2. The fuel tank assembly according to claim 1, wherein said body frame further comprises a side frame extending behind the engine towards an upper rear portion of the motorcycle below the seat rail; and wherein the mounting flange of the fuel pump unit is disposed above the side frame.

3. The fuel tank assembly according to claim 1, further comprising a discharge pipe extending from the fuel pump unit;

wherein the body frame further comprises a side frame extending rearwardly of the engine; and wherein the mounting flange of the fuel pump unit and the discharge pipe are located in a space defined between the seat rail and the side frame.

4. The fuel tank assembly according to claim 2, further comprising a discharge pipe extending from the fuel pump and installed on a lower side of the mounting flange, wherein the mounting flange of the fuel pump unit and the discharge pipe are located in a space defined between the seat rail and the side frame.

5. The fuel tank assembly according to claim 1, wherein:

the body frame further comprises left and right body frames, each having a main frame;

the motorcycle comprises a body frame crossmember connecting the left and right body frames together installed between the main frame and the seat rail; and the mounting flange of the fuel pump unit is arranged behind and proximate to the body frame crossmember.

6. The fuel tank assembly according to claim 2, wherein:

the body frame further comprises left and right body frames, each including a main frame;

the motorcycle comprises a body frame crossmember connecting the left and right body frames together installed between the main frame and the seat rail; and the mounting flange of the fuel pump unit is arranged behind and proximate to the body frame crossmember.

7. The fuel tank assembly according to claim 3, wherein:

the body frame further comprises left and right body frames, each including a main frame;

the motorcycle comprises a body frame crossmember connecting the left and right body frames together installed between the main frame and the seat rail; and the mounting flange of the fuel pump unit is arranged behind and proximate to the body frame crossmember.

8. An arrangement structure for the fuel tank assembly according to claim 1, wherein the motorcycle further comprises a swing arm for supporting the rear wheel, and a swing arm crossmember provided on the swing arm; and wherein said swing arm crossmember is disposed substantially below the fuel pump unit.

9. An arrangement structure for the fuel tank assembly according to claim 2, wherein the motorcycle further comprises a swing arm for supporting the rear wheel, and a swing arm crossmember provided on the swing arm; and wherein said swing arm crossmember is disposed substantially below the fuel pump unit.

10. An arrangement structure for the fuel tank assembly according to claim 3, wherein the motorcycle further comprises a swing arm for supporting the rear wheel, and a swing arm crossmember provided on the swing arm; and wherein said swing arm crossmember is disposed substantially below the fuel pump unit.

11. An arrangement structure for the fuel tank assembly according to claim 5, wherein the motorcycle further comprises a swing arm for supporting the rear wheel, and a swing arm crossmember provided on the swing arm; and wherein said swing arm crossmember is disposed substantially below the fuel pump unit.

12. A motorcycle comprising:

a body frame having a seat rail, and a seat supported on the seat rail, an engine supported by the body frame;

a rear wheel operatively supported by the body frame; and a fuel tank assembly comprising:

a fuel tank disposed extending substantially along the seat rail in a space surrounded by a lower portion of the seat and the seat rail; and a fuel pump unit arranged in a forward lower portion of the fuel tank and at an angle from a horizontal plane, said fuel pump unit comprising a mounting flange;

wherein said fuel tank is formed in a long and flat shape, and is arranged in a tilted manner in a back and forth direction of the motorcycle so as to extend substantially along the seat rail such that a front end portion of the fuel tank is located at a position beyond a front end portion of the seat rail;

wherein the fuel tank is supported at a front end portion thereof by a front end portion of said seat rail;

wherein said mounting flange used for mounting the fuel pump unit to the fuel tank is arranged below the seat rail and forward of a front end of the rear wheel of the motorcycle, said mounting flange being a plate shaped cylindrical member having a plurality of insertion holes formed therein; and wherein said mounting flange is secured to a lower portion of the fuel tank such that substantially the entire body of the fuel pump unit is mounted inside said fuel tank and above a joining plane between the fuel tank and the mounting flange.

13. A motorcycle according to claim 12, wherein said body frame further comprises a side frame extending rearwardly and upwardly of the engine below seat rail; and wherein the mounting flange of the fuel pump unit is disposed above the side frame.

14. A motorcycle according to claim 12, wherein:

said fuel tank assembly further comprises a discharge pipe extending from the fuel pump unit and installed on a lower side of the mounting flange;

said body frame further comprises a side frame extending rearwardly of the engine; and the mounting flange of the fuel pump unit and the discharge pipe are located in a space defined between the seat rail and the side frame.

15. A motorcycle according to claim 12, further comprising a body frame crossmember; wherein:

the body frame further comprises a left body frame and a right body frame, each including a main frame;

the body frame crossmember which connects the left and the right body frames together is installed between the main frame and the seat rail; and the mounting flange of the fuel pump unit is arranged behind and proximate to the body frame crossmember.

16. A motorcycle according to claim 12, further comprising a swing arm for supporting the rear wheel, and a swing arm crossmember provided on the swing arm, wherein said swing arm crossmember is disposed substantially below the fuel pump unit.

17. In a motorcycle comprising a body frame having a seat rail, and a seat supported on the seat rail, an engine supported by the body frame; and a rear wheel supported by the body frame; the improvement comprising a fuel tank assembly;

said fuel tank assembly comprising a fuel tank disposed extending substantially along the seat rail in a space surrounded by a lower portion of the seat and the seat rail; and a fuel pump unit disposed in a lower forward portion of the fuel tank, said fuel pump unit comprising a mounting flange;

wherein said fuel tank is formed in a long and flat shape, and is arranged in a tilted manner in a back and forth direction of the motorcycle so as to extend substantially along the seat rail such that a front end portion of the fuel tank is located at a position beyond a front end portion of the seat rail;

wherein the fuel tank is supported at a front end portion thereof by a front end portion of said seat rail;

wherein said mounting flange which mounts the fuel pump unit to the fuel tank is arranged below the seat rail and forward of a front end of the rear wheel of the motorcycle, said mounting flange being a plate shaped cylindrical member having a plurality of insertion holes formed therein; and wherein said mounting flange is secured to a lower portion of the fuel tank such that substantially the entire body of the fuel pump unit is mounted inside said fuel tank and above a joining plane between the fuel tank and the mounting flange.

18. A motorcycle according to claim 17, wherein said body frame further comprises a side frame extending rearwardly and upwardly of the engine below seat rail; and wherein the mounting flange of the fuel pump unit is disposed above the side frame and at an angle from a horizontal plane.

19. A motorcycle according to claim 17, wherein said fuel tank assembly further comprises a discharge pipe extending from the fuel pump unit;

wherein said body frame further comprises a side frame extending rearwardly of the engine; and wherein the mounting flange of the fuel pump unit and the discharge pipe are located in a space defined between the seat rail and the side frame.

20. A motorcycle according to claim 17, further comprising a body frame crossmember, a swing arm for supporting the rear wheel; and a swing arm crossmember provided on the swing arm;

wherein:

the body frame further comprises a left body frame and a right body frame, each including a main frame;

the body frame crossmember which connects the left and the right body frames is installed between the main frame and the seat rail;

the mounting flange of the fuel pump unit is arranged behind and proximate to the body frame crossmember; and wherein said swing arm crossmember is disposed substantially below the fuel pump unit.

* * * * *